F. M. COLLINS.
BRICK JOINT RAKER.
APPLICATION FILED DEC. 14, 1917.
1,262,018.
Patented Apr. 9, 1918.
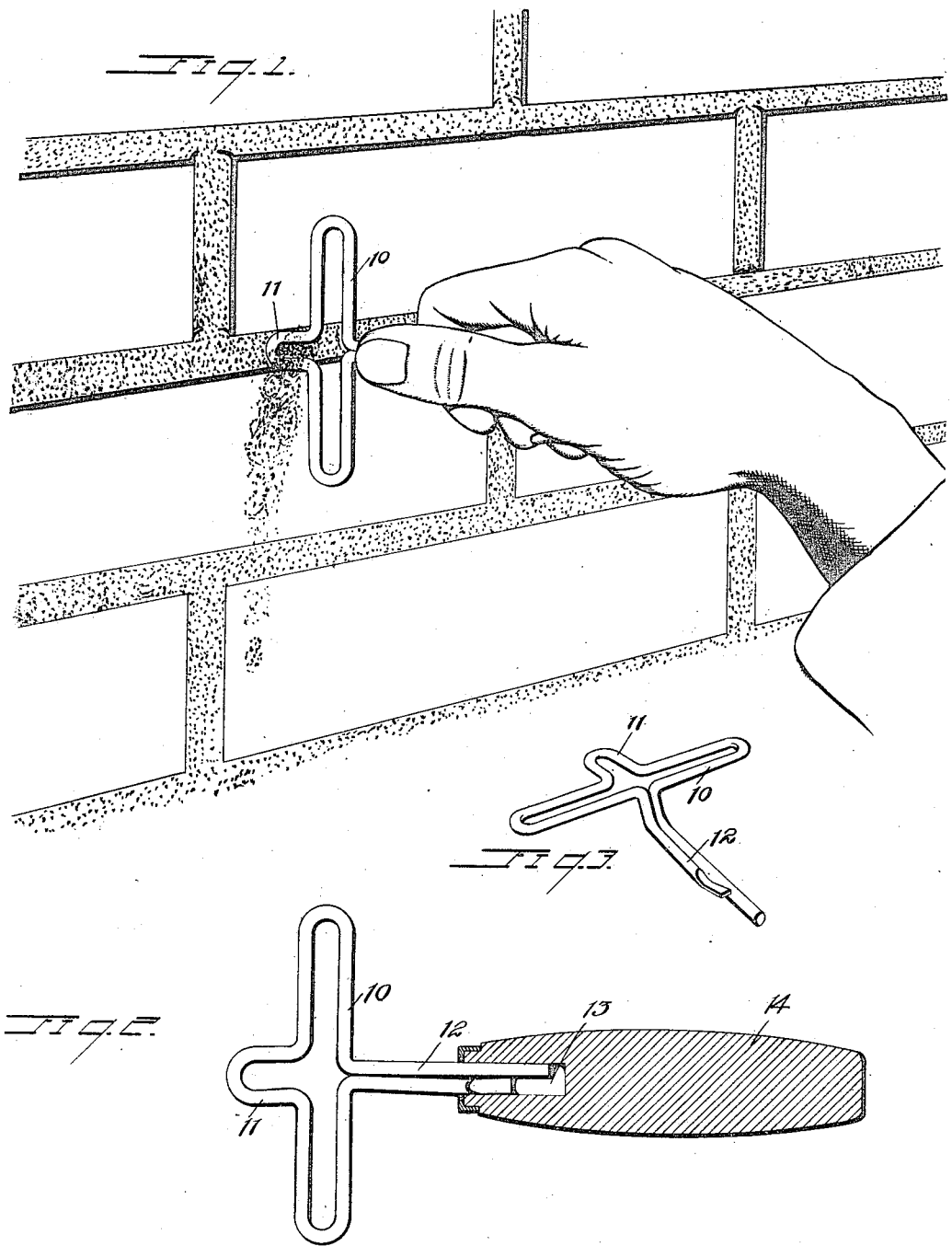

UNITED STATES PATENT OFFICE.

FRANK M. COLLINS, OF WASHINGTON, DISTRICT OF COLUMBIA, ASSIGNOR OF ONE-HALF TO JOSEPH W. COLLINS, OF WASHINGTON, DISTRICT OF COLUMBIA.

BRICK-JOINT RAKER.

1,262,018.  Specification of Letters Patent.  Patented Apr. 9, 1918.

Application filed December 14, 1917. Serial No. 207,169.

*To all whom it may concern:*

Be it known that I, FRANK M. COLLINS, a citizen of the United States, and a resident of Washington, in the District of Columbia, have invented a new and useful Improvement in Brick-Joint Rakers, of which the following is a specification.

My present invention relates generally to tools or implements for raking the joints of brick work or in other words scraping out a portion of mortar or cement between the bricks as is done in the well-known type of rake joint brick work. Implements and tools for this purpose as now used are extremely crude and in all instances known at present require smoothing of the joint after it is raked which thus necessitates going over the joints twice, first for the purpose of raking them and second for the purpose of smoothing them, and the primary object of my invention is therefore the provision of an implement of this nature which will rake the joint and smooth it at the same time so as to avoid the necessity above mentioned.

Another object of my invention is to provide a simple inexpensive implement which will permit of the ready escape of the mortar, cement or binding material scraped from between the bricks and avoid collection of the same upon the faces and edges of the bricks near the joints.

Other objects and the resulting advantages of my invention will be apparent from the following description thereof, referring to the accompanying drawing, forming a part of this specification, and in which Figure 1 is a perspective view illustrating the practical application of my improved implement, Fig. 2 is a side elevation of the implement with the handle in section, Fig. 3 is a detail perspective view of the implement removed from its handle.

Referring now to these figures, my improved implement the use of which may be plainly seen by reference to Fig. 1, is preferably constructed of a single section of wire bent to form an elongated transverse loop 10, and a loop 11 at one side of the loop 10 and at a point centrally between the ends of the latter, extending at right angles with respect to the said loop 10 so as to form a protuberance adapted to extend between the adjacent edges and ends of the bricks as seen in Fig. 1 with the loop 10 constituting a guide against the exposed faces of the bricks.

It will be noted that the loop 10 constituting a guide and the loop 11 forming the raking protuberance are both provided in this way with openings which communicate with one another and which provide for the ready escape of the material therethrough so as to avoid collection of this material in front of the implement as the latter is passed between the bricks and obviate its collection upon the exposed faces of the bricks or their edges adjacent the joints. It will be observed furthermore that the construction of the protuberance 11 as described, in consideration of the freedom with which this material may pass through this protuberance and through the loop 10 adapts the implement not only to the raking of a joint but to the smoothing of the mortar or cement or other binder as the joint is being raked so as to obviate the necessity of going over the raked joint a second time for the purpose of smoothing the same as is required at the present time.

The ends of the section of wire extend from the loop 10 at the relatively opposite side thereof as compared to the loop 11 and preferably project in parallel relation as seen at 12, to form a shank, the free end of the latter of which may be extended within the axial opening 13 for instance of a handle 14, this construction providing for the use of a number of such implements with each handle in view of the susceptibility of such implement to wear far beyond that of the handle.

It is thus obvious that my invention provides a simple inexpensive implement for the above purpose which will for the foregoing reasons be highly efficient and desirable in use.

It is obvious furthermore that while I have shown and described the implement as constructed of a single section of round wire it may be formed of wire other than round wire or it may be formed of other material so long as it is constructed to provide for the ready passage of the material therethrough and is capable of smoothing as well as raking the joint.

I claim:—

1. A brick joint raker constructed of a single section of wire bent to form an elongated transverse loop and a loop at one side, and intermediate the ends, of the first loop and at right angles thereto, the extensions of said wire being bent from the opposite side of the said first loop and at right angles thereto to form a shank for the purpose described.

2. A brick joint raker constructed of a single section of wire bent to form loops projecting at right angles and opening into one another and of which one loop extends from a point intermediate the ends of the other loop and forms a raking protuberance, and the extension of which wire projects in alinement with and in the opposite direction to the said raking protuberance, to form a shank for the purpose described.

3. An implement of the character described constructed of a single section of wire bent to form an intermediate elongated transverse loop constituting a guide and a loop projecting from one side and at right angles to the said guide loop at a point centrally between the ends of the latter to constitute a raking protuberance, the extensions of said section of wire being bent from the opposite side of said guide loop in alinement with the said raking protuberance, and a handle having an axial bore in which the free ends of said latter extensions are detachably mounted.

4. A brick joint raker consisting of an implement having a head formed of a single section of material provided with guide extensions to coöperate with a brick surface and having a joint raking protuberance having a smooth rounded surface, said head and its said protuberance being provided with communicating openings through which the material may pass.

FRANK M. COLLINS.

Copies of this patent may be obtained for five cents each, by addressing the "Commissioner of Patents, Washington, D. C."